(12) United States Patent
Seetharam et al.

(10) Patent No.: US 8,516,075 B2
(45) Date of Patent: Aug. 20, 2013

(54) PROVIDING SUPPLEMENTAL CONTENT ASSOCIATED WITH AN INFORMATION DEVICE

(75) Inventors: Ananth Seetharam, Karnataka (IN); Jon J. Candelaria, Scottsdale, AZ (US); Shrikant S. Naidu, Bangalore (IN); Jon L. Schindler, Glenview, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 191 days.

(21) Appl. No.: 13/076,385

(22) Filed: Mar. 30, 2011

(65) Prior Publication Data
US 2012/0254347 A1     Oct. 4, 2012

(51) Int. Cl.
*G06F 15/16* (2006.01)

(52) U.S. Cl.
USPC ............................ 709/217; 709/203; 709/219

(58) Field of Classification Search
USPC .......................................... 709/203, 217, 219
See application file for complete search history.

(56) References Cited

U.S. PATENT DOCUMENTS

| | | | |
|---|---|---|---|
| 2004/0024889 A1* | 2/2004 | Getsin et al. ................. | 709/229 |
| 2005/0273828 A1 | 12/2005 | Barton | |
| 2008/0141324 A1* | 6/2008 | Keum et al. .................. | 725/116 |
| 2009/0320073 A1* | 12/2009 | Reisman ........................ | 725/51 |
| 2010/0306402 A1* | 12/2010 | Russell et al. ................ | 709/231 |
| 2011/0154404 A1* | 6/2011 | Piepenbrink et al. .......... | 725/53 |
| 2012/0020428 A1* | 1/2012 | Roth et al. .................... | 375/295 |

FOREIGN PATENT DOCUMENTS

| | | |
|---|---|---|
| WO | 2006089555 A1 | 8/2006 |
| WO | 2007138546 A1 | 12/2007 |

OTHER PUBLICATIONS

Kohtake, N. et al., "InfoStick: An Interaction Device for Inter-Appliance Computing," Proceedings of the 1st international symposium on Handheld and Ubiquitous Computing, pp. 246-258, 1999.

Sousa, J. P. et al., "Aura: an Architectural Framework for User Mobility in Ubiquitous Computing Environments," Proceedings of the IFIP 17th World Computer Congress—TC2 Stream /3rd IEEE/IFIP Conference on Software Architecture: System Design, Development and Maintenance, pp. 29-43, 2002.

Sugiura, A. et al., "A user interface using fingerprint recognition: holding commands and data objects on fingers," Proceedings of the 11th annual ACM symposium on User interface software and technology, pp. 71-79, 1998.

International Search Report and Written Opinion for International Patent Application No. PCT/US2012/028677 mailed on May 23, 2012.

Art Video—Motorola Creates a Vision for the Future of Video—http://www.youtube.com/watch?v=pe3YSf8QzpA&feature=player_embedded—6:24 minutes Motorola Technology & Vision—MIT2R3L4FG2—Apr. 2010.

* cited by examiner

*Primary Examiner* — Phuoc Nguyen
(74) *Attorney, Agent, or Firm* — Brian M. Mancini

(57) ABSTRACT

A system and method for providing supplemental content associated with an information device includes a user device detecting (700) the information device and that the information device has associated supplemental content. A next step includes requesting (702) a delivery of the supplemental content. A next step includes delivering (704) the supplemental content to a remote device, such as a home television. A next step includes presenting (706) the supplemental content to a user on the remote device.

12 Claims, 7 Drawing Sheets

PROVIDING SUPPLEMENTAL CONTENT ASSOCIATED WITH AN INFORMATION DEVICE

FIELD OF THE DISCLOSURE

The present invention relates generally to electronic devices such as signs that present information to a user, and more particularly to providing supplemental information associated with such a device.

BACKGROUND

At present, many different types of programmable, digital or electronic signage exist. The target markets for such signs can be in retail, manufacturing or healthcare environments, for example. Typically, these signs are powered by line voltage and can be programmable by a server through a wired control connection to provide specific text, video or graphic images. Such signs can be used for informational or advertising purposes. For example, a digital sign or screen offers an opportunity to present relevant information to a shopper in a retail store.

Conventional digital signs (for example, screens in a shopping aisle or screens hanging from a shop's ceiling) require a viewer to be present in front of the screen to fully understand the information presented. Often times a viewer will have limited time to view all the information on a sign, even though that viewer may be very interested in viewing all of the available information being displayed on the sign. Further, a viewer may wish to obtain more detailed information about the content that is not being displayed on the sign.

Accordingly, there is a need for a technique to provide content of interest to a viewer where that viewer is unable to presently consume all of the available information. It would also be of benefit to provide such information at a later time and more convenient venue for a consumer.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
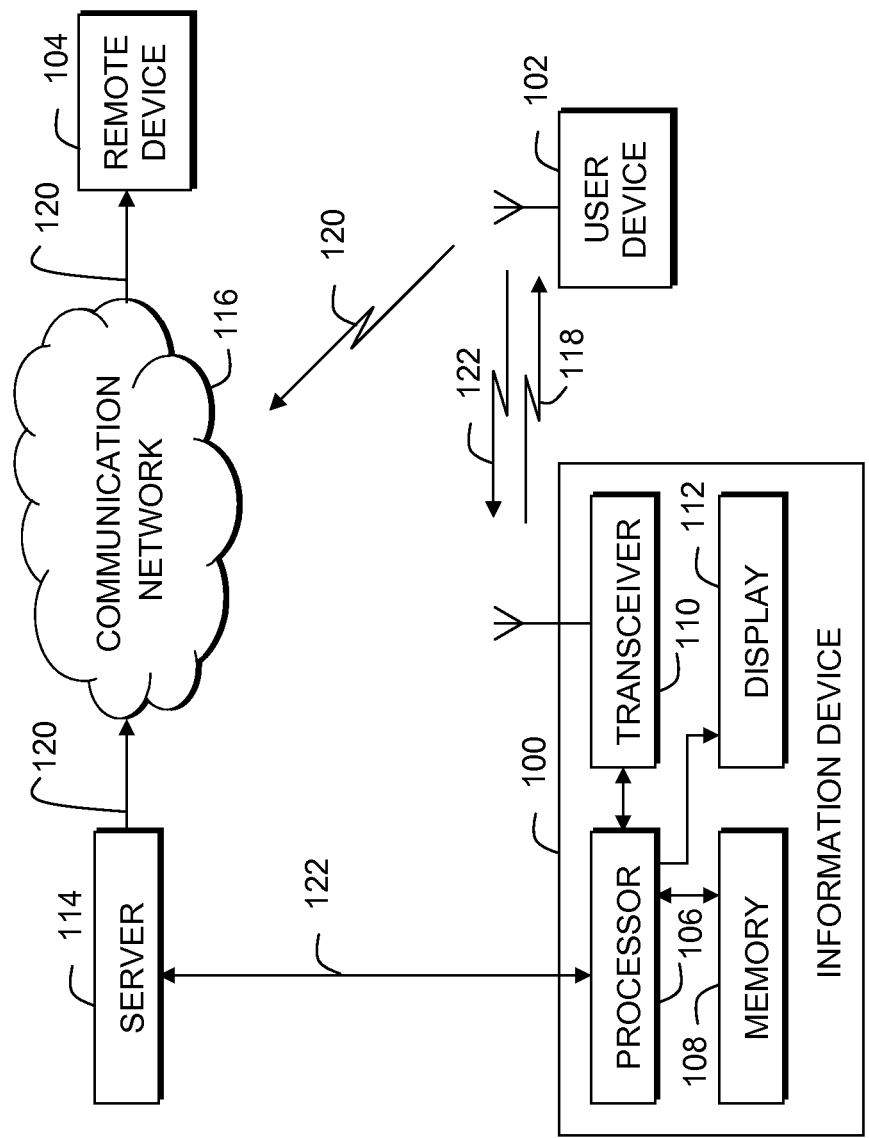
FIG. 1 is a simplified block diagram of a system, in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides a technique to provide content of interest to a viewer where that viewer is unable to presently consume all the available information on that content. The present invention provides such information at a later time and more convenient venue for a consumer. For example, a shopper can request additional information, such as in the form of a video, related to content being displayed on a sign for subsequent viewing at home. For instance, a shopper in a grocery store who sees an advertisement for a new food ingredient on a digital sign might be interested in watching a video with recipes that use the food ingredient on their home television. Existing art does not allow one to select media bundles, related to content being displayed on digital sign, for subsequent viewing at home.

FIG. 1 is a block diagram depiction of a digital sign 100 with a wireless radio transceiver 1110. The sign 100 also includes a processor 106, memory 108, and display 112. The sign 100 is connected in a network to server 114 either directly or through intermediate entities. The server 114 can include many different entities as will be detailed below. The sign can be directly wired to the server (as shown) or can be wirelessly connected through an access point (not shown). In other words, the server can be wired to the processor (as shown), or the server can wireless communicate with the transceiver 110 (not shown), to provide instructions for the processor 106 to update the display 112, for example. A user device 102 is used to interact with the sign. The user device can be a user's personal cellular device or a personal shopping system (PSS) assistant device provided by the establishment hosting the sign. A remote device 104 can be a user's home computer, television, subscriber set-top box, etc. The server 114 (and optionally the user device 102) can communicate, wired or wirelessly, with the remote device through a communication network 116, such as the Internet. The communication network 116 can include many other entities as will be detailed below.

Those skilled in the art will recognize that FIG. 1 does not depict all of the equipment necessary for system to operate but only those system components and logical entities particularly relevant to the description of embodiments herein. For example, digital signs, servers, and communication devices can all include processors, communication interfaces, memories, etc. In general, components such as processors, memories, and interfaces are well-known. For example, processing units are known to comprise basic components such as, but not limited to, microprocessors, microcontrollers, memory cache, application-specific integrated circuits (ASICs), and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement a processor that performs the given logic. Therefore, the entities shown represent a known system that has been adapted, in accordance with the description herein, to implement various embodiments of the present invention. Furthermore, those skilled in the art will recognize that aspects of the present invention may be implemented in and across various physical components and none are necessarily limited to single platform implementations.

The digital sign 100, server 114, and user device 102 can be operable on various different known wired and wireless communication technologies. The wired network (e.g. 116) can use Internet protocols (i.e. HTTP/TCP/IP). The wireless systems can include cellular, local, and wide-area networks, or other IEEE 802.11 wireless communication system, including WiFi. However, it should be recognized that the present invention is also applicable to other wireless communication systems. For example, the description that follows can apply to one or more communication networks that are IEEE 802.xx-based, employing wireless technologies such as IEEE's 802.11, 802.16, 802.20, or Bluetooth™, modified to implement embodiments of the present invention.

Referring back to FIG. 1, the present invention includes a system for providing supplemental content associated with an information device. A user device 102 is operable to detect the information device 100 (e.g. a digital sign providing information in a business establishment) and that the information device has associated supplemental content. In one embodiment, the user device 102 can provide means thereon (such as an icon on its display 112) for a user to request further information associated with the content displayed on the device 100. For example, the user device 102 could detect the information device 100 (such as through a Bluetooth™ transceiver 110 and obtain an indication that supplemental content is available, whereupon the user device can display user-selectable options representing the supplemental content, determine a user-selected option to initiate the delivery of the supplemental content to the user device 102 or a remote device 104 while providing user preferences for addressing and formatting the supplemental content using the user preferences. This embodiment also provides means for delivering the supplemental content to the remote device. For example, the means for delivering is a server 114 associated with the information device 100, wherein the user device 102 is operable to provide its user preferences 122 and an indication of the desired content to the server 114 through the sign 100, and the server is operable to deliver the supplemental content 120 stored thereon to the remote device 104 using the user preferences.

In either embodiment, a remote device 104 is operable to receive the delivered supplemental content and present the supplemental content to a user, such as via the use of a home television screen or computer display, for example.

Figure 2:
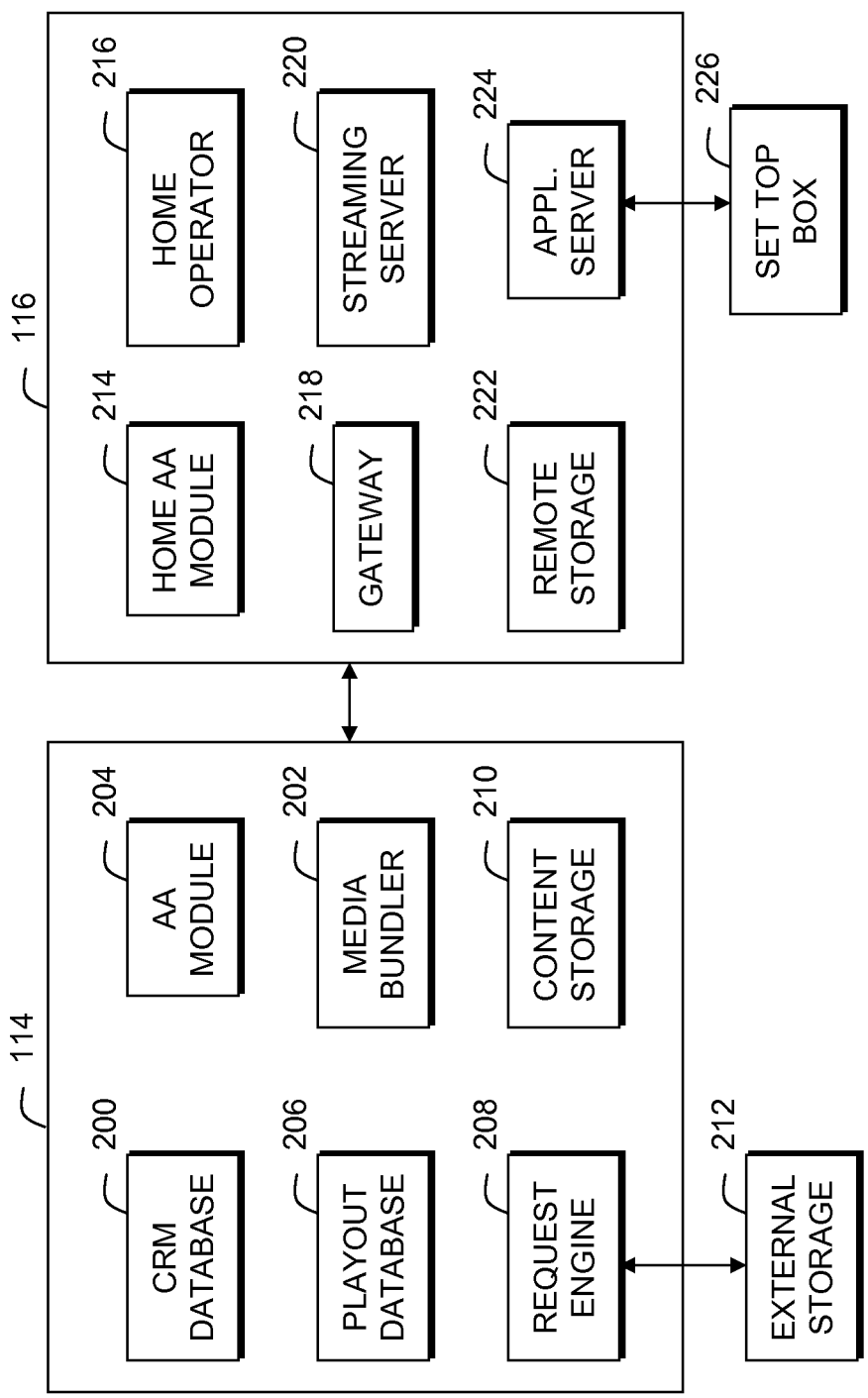
FIG. 2 is an expanded block diagram of portions of FIG. 1.

FIG. 2 expands the server 114 and communication network 116 of FIG. 1. In the example used herein, the server 114 serves a retail establishment and includes a Customer Relationship Management database 200 that includes customer information, shopping habits, preferences, loyalty card identification, etc. A playout database 206 includes the information that is presently being displayed on the digital sign 100 in the store. An authentication and authorization module 204 allows a customer access to information in the server upon identification by the CRM database 200. A request engine 208 is provided for a customer to interact with the server 114. Content storage 210 and/or external (advertiser) storage 212 holds supplemental content of interest to the customer. A media bundler 202 supplies any user-requested supplemental content from the server 114.

The communication network 116 includes components that provide communications with a home environment of the customer. These can include a communication gateway 218 of a home operator 216, as is known in the art, and a home authentication and authorization module 214 that allows customer access for their home communications. A home operator 216 controls the media services available at home to the customer, such as through a set top box. Remote storage 222 can be provided that includes storage for media on a home operator server for the customer, such as storage for video-on-demand services, or alternatively the remote storage could be a digital video recorder at the customer's home. An optional unicast streaming server 220 can provide video-on-demand services, for example, to a customer through the home operator 216. An application server 224 of the home operator can provide notification of, and handle requests for, supplemental content services in accordance with the present invention.

Referring to FIGS. 3-6, a specific embodiment is presented for a retail customer requesting delivery of supplemental content to a video-on-demand server for a home set top box. It is envisioned that a user device will have an application from the retailer loaded thereon to implement the present invention.

Figure 3:
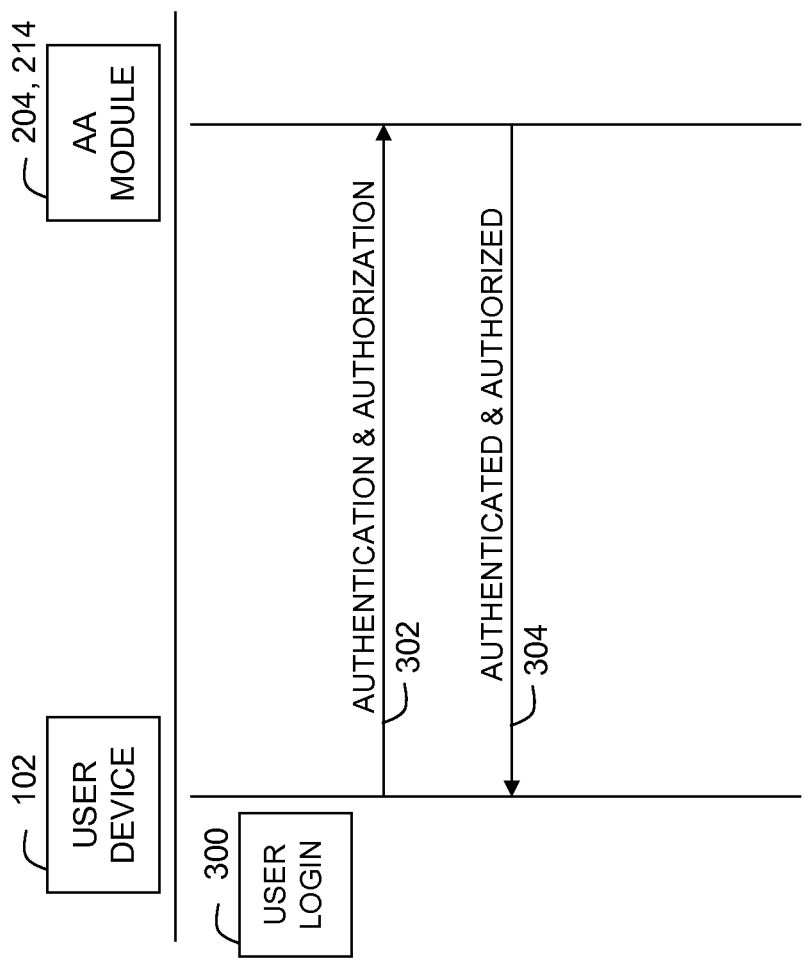
FIGS. 3-6 show a flow diagram of the operation of one embodiment of the present invention.

In FIG. 3, a user upon entering the store and wishing to access its services may login 300 to the in-store network. Upon login 300 the user's device, such as the user's cellular telephone or a PSS assistant device provided by the store, will go through an authentication and authorization procedure 302, 304. It should be noted that the AA function used here can be shared between the in-store network (i.e. module 214) and an out-of-store network (i.e. module 214) if the user device 102 is a customer's cellular telephone. After the authentication and authorization procedure 302, 304 the user device 102 will be allowed to access the in-store systems.

Figure 4:
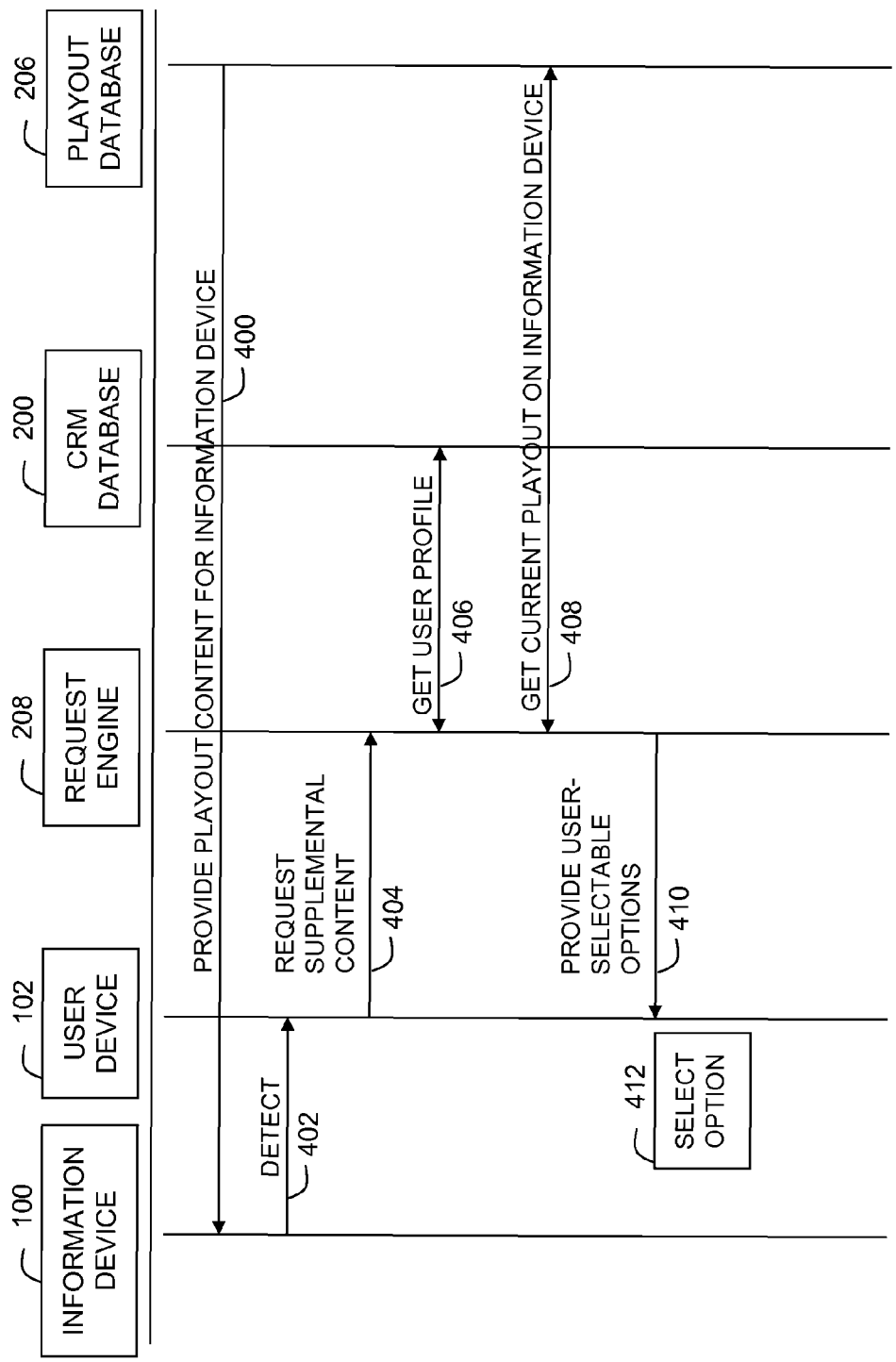

In FIG. 4, after authorization, a user can roam through the store with their user device 102. The store will be displaying information on digital signs located throughout the store. The signs could have a static or dynamic display that is fed by a playout database 206 connected to the signs through the in-store network. The user device will be able to detect 402 the digital signs having wireless transceivers (i.e. a beacon from a Bluetooth™ transceiver 110 of FIG. 1 that provides a Bluetooth™ identification). Similarly, the sign could discover the user device for pairing. Alternatively, detection could occur by any one of scanning a (1D or 2D) barcode printed on the sign, an Electronic Article Surveillance (EAS) tag affixed to the sign, a Radio Frequency Identification (RFID) tag embedded in the sign, a Short Messaging Service (SMS) short code listed on the sign for the user to dial or sent by the sign, and the like. In accordance with the present invention, the digital sign 100 will communicate with the user device 102 that it has supplementary content about the information currently being displayed on the sign 100.

The user can use the application to request delivery of supplemental content 404. The response will be wirelessly communicated to a request engine 208 in the store via the in-store local area network. This can be done back through the sign or directly over the local area network. This communication can include an identity of the user or user device and an identifier of the digital sign of interest. The request engine 208 can use the identity to obtain 406 a user profile previously stored in a CRM database 200. The request engine 200 can also use the identifier to ascertain what information is presently being played out 408 on the indicated sign in order to properly correlate with the requested supplemental content. Information about any available supplementary content could be communicated 410 to the user device to be displayed as user-selectable options describing the available supplementary content. For example, a sign displaying a sale on a new grocery item could have associated supplemental content describing a recipe using that item, nutritional information about that item, etc. A user could then select 412 one of the user-selectable options for supplemental content if desired.

Figure 5:
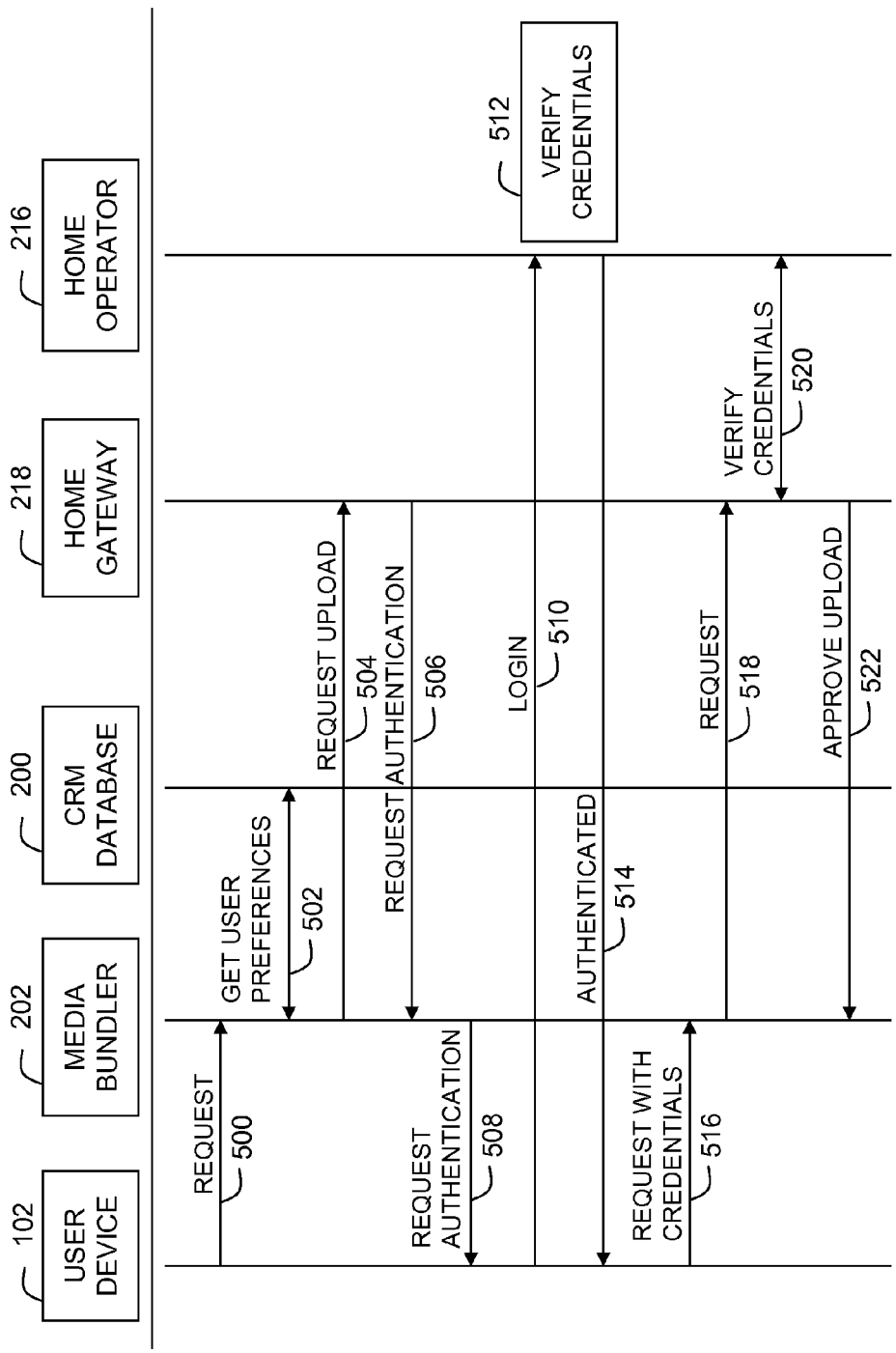

Referring to FIG. 5, upon a selection the user device 102 can communicate a request 500 to the media bundler 202 for deliver the content of the selected option to her home for later viewing. The media bundler will then obtain user preferences 502 from the CRM database 200. The user preferences can specify a user identity, the user's home operator, and a delivery address (e.g. IP address or home operator address) for the content along with any protocols or formatting required to suit the user's home viewing equipment, if any, to properly deliver the content. The media bundler 202 can also request permission, from a home gateway serving the customer's remote (home) device, to upload 504 the content. In response to this request 504, the home gateway could request authentication 506 from the requesting media bundler 202. The media bundler can direct this request 508 to the user device so that the user could directly login 520 with their home operator in order to verify their request for the upload of this content. In this instance, it is assumed that the home operator 216 is an identity management server. The home operator 216 can exchange messaging with the user device in order to authenticate 514 the request, whereupon the user device 102 can reply to the media bundler 202 with the credentialed upload request 516. The media bundler 202 can then forward the request 518 to the home gateway 218, which verifies the credentials 520 with the home operator 520. Upon verification 520, the home gateway sends a response 522 to the media bundler 202 approving the upload of the content to a specified storage device. Although a basic sequence is demonstrated here, it should be recognized that there may be variance to accommodate the use of advertising, coupons, feedback and measurement, and the like.

Figure 6:
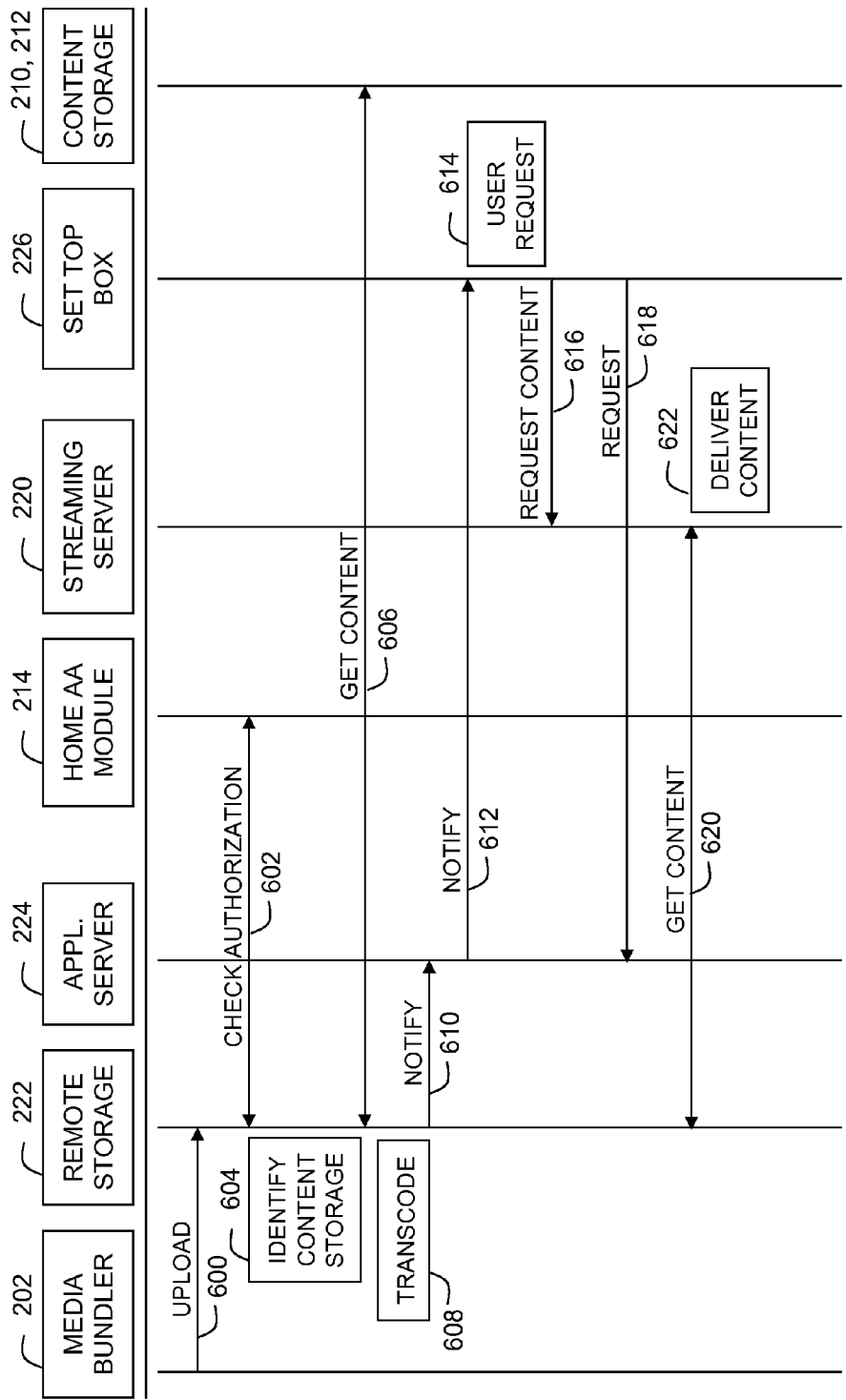

Referring to FIG. 6, upon approval the media bundler 202 will request upload for the identified user of the user-selected supplemental content from content storage 210, 212 to the specified remote storage device 222, which can be a user's home digital video recorder, a headend of the home operator, or a video-on-demand server of the home operator, as demonstrated here. The remote storage 222 will check authorization 602 of the identified user of the upload with a home authentication and authorization module 214. The request can include a session specific set of credentials provided by the retailer. The credentials provided by the retailer can be valid for a limited duration of time. Upon authorization, the remote storage 222 can locate and identify 604 where the content to be uploaded is presently being stored (i.e. at the retail establishment server 210 or at an advertiser's external source 212). The remote storage 222 can then get 606 the content from the identified source 210, 212 including any associated information such as textual information. If necessary the content can be transcoded 608, if required, before or after storage. The remote storage will notify 610 the application server 242 of the home operator of the availability of the content. The application server 224 will then notify 612 the user's set-top box to indicate that the content is available for the user. Fore example, the customer may be notified of the content by the presence of a new television bookmark, or by indicating an alert on the television.

At a later time, when the user arrives home, the user will be able to see from their home set top box that the content is available for viewing on their television 104. The user can then enter an instruction on their set top box to request 614 the content to be streamed to the user's home television. This request 616 is sent to the video-on-demand unicast streaming server 220 of the home operator. Alternatively, the content could be downloaded and then played. A request 618 could also be sent back to the application server 224 to provide any associated information related to the content, such as textual information relating to price, ingredients, instructions, etc. The streaming server can then get the (transcoded) content 620 from the video-on-demand storage 222 to deliver (stream) the content to the user's home television 104. Not shown in this sequence diagram are messages that illustrate the transfer of the content to a video-on-demand repository complex that is closest to the customer. It is assumed that the gateway in the home operator points the content storage 210, 212 to a video-on-demand storage complex 222 that is closest to the customer's home.

Figure 7:
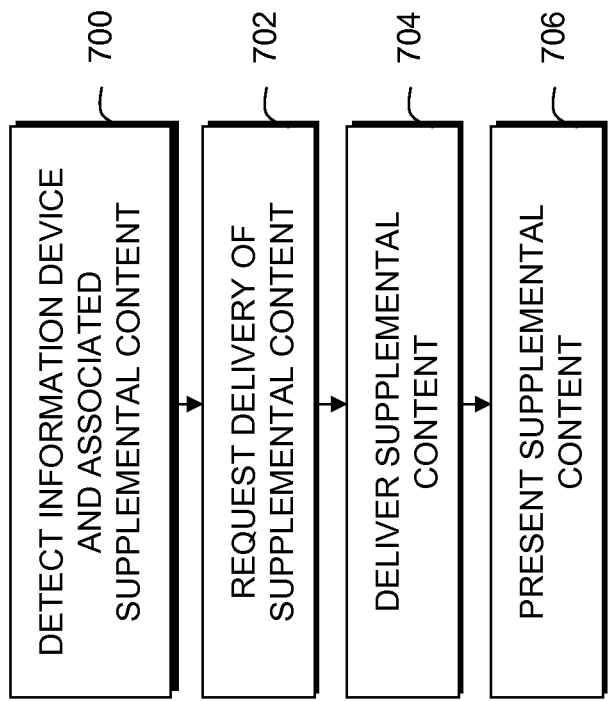
FIG. 7 is a flowchart of a method, in accordance with the present invention.

FIG. 7 illustrates a flowchart of a method for providing supplemental content associated with an information device, in accordance with the present invention.

A first step 700 includes detecting the information device (e.g. a digital sign providing information in a business establishment) and that the information device has associated supplemental content. Detecting 700 includes a user device detecting the information device and obtaining an indication that supplemental content is available, whereupon the user device displays user-selectable options representing the supplemental content.

A next step 702 includes requesting a delivery of the supplemental content. Requesting includes a user selecting an option to initiate the delivery of the supplemental content to a remote device while providing user preferences for delivering the content, wherein the user preferences include addressing and formatting instructions for the supplemental content.

A next step 704 includes delivering the supplemental content to a remote device. For example, delivering includes downloading the supplemental content to the user device and delivering the supplemental content from the user device to the remote device using the user preferences. In alternative example, delivering includes providing the user preferences to a server associated with the information device, and the server delivering the supplemental content to the remote device using the user preferences.

A next step 706 includes presenting the supplemental content to a user on the remote device (e.g. the user's home television of computer).

Advantageously, the present invention provides a technique to provide content of interest to a viewer where that viewer is unable to presently consume all the available information on that content. The present invention provides such information at a later time and more convenient venue for a consumer.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for providing supplemental content associated with product information displayed on a digital sign in a retail establishment, the system comprising:
    a user communication device operable to detect the digital sign and to determine that the product information displayed on the digital sign has associated supplemental content by communicating with the digital sign to receive an indication indicate there is supplemental content available for the product information displayed;
    means for requesting a delivery of the supplemental content to the user's home, wherein requesting is an application on the user communication device that provides an identification of the digital sign and communicates with an in-store request engine that returns an indication of available supplemental content for the identified digital sign to the user communication device to be displayed by the application as user-selectable options describing the available supplementary content;
    a server associated with the retail establishment for delivering the supplemental content to the user's home upon receiving the request for delivery; and
    a remote storage device operable to receive the delivered supplemental content and operable to present the delivered supplemental content to the user in the user's home at a later time.

2. The system of claim 1, wherein the server also determines the product information that is presently being displayed on the digital sign to properly correlate with the requested supplemental content.

3. The system of claim 1, wherein the application is provided to the user communication device by the retail establishment.

4. The system of claim 1, wherein the user communication device application is operable to provide the user preferences for addressing and formatting the delivered supplemental content to the server, and the server is operable to deliver the supplemental content to the remote storage device using the user preferences.

5. The system of claim 1, further comprising:
    a home television operable to receive the delivered supplemental content and present the delivered supplemental content to the user, and
    wherein the user communication device is a personal cellular device.

6. The system of claim 1, wherein the user communication device communicates with the digital sign using a Bluetooth™ transceiver.

7. A method for providing supplemental content associated with product information displayed on a digital sign in a retail establishment, the method comprising:
    detecting the digital sign by a user communication device and determining by the user communication device that the product information displayed on the digital sign has associated supplemental content by communicating with the digital sign to receive an indication indicate there is supplemental content available for the product information displayed;

requesting a delivery of the supplemental content to the user's home, wherein requesting is performed by an application on the user communication device that provides an identification of the digital sign and communicates with an in-store request engine that returns an indication of available supplemental content for the identified digital sign to the user communication device to be displayed by the application as user-selectable options describing the available supplementary content;

delivering the supplemental content to a remote storage device by a server associated with the retail establishment; and presenting the delivered supplemental content to the user in the user's home at a later time by the remote storage device.

8. The method of claim 7, wherein the delivering step includes that server also determining the product information that is presently being displayed on the digital sign to properly correlate with the requested supplemental content.

9. The method of claim 7, wherein the application is provided to the user communication device by the retail establishment.

10. The method of claim 7, wherein delivering includes the user communication device application providing the user preferences for addressing and formatting the delivered supplemental content to the server associated with the digital sign, and the server delivering the supplemental content to the remote storage device using the user preferences.

11. The method of claim 10, wherein the user preferences specify a user identity, the user's home operator, and a delivery address.

12. The method of claim 7, wherein delivering includes indicating on a user's set-top box that the delivered supplemental content has been stored from the retail establishment and is available for viewing.

* * * * *